United States Patent [19]

Mackiw et al.

[11] Patent Number: 4,645,532
[45] Date of Patent: Feb. 24, 1987

[54] PRODUCTION OF FINE SPHERICAL COPPER POWDER

[75] Inventors: Vladimir N. Mackiw, Etobicoke; Alexander Nadezhdin, Edmonton; Donald R. Weir, Fort Saskatchewan, all of Canada

[73] Assignee: Sherritt Gordon Mines Limited, Toronto, Canada

[21] Appl. No.: 787,186

[22] Filed: Oct. 15, 1985

Related U.S. Application Data

[63] Continuation-in-part of Ser. No. 651,566, Sep. 18, 1984, abandoned.

[30] Foreign Application Priority Data

Sep. 30, 1983 [GB] United Kingdom ............... 8326235

[51] Int. Cl.$^4$ .............................................. B22F 9/00
[52] U.S. Cl. .................................. 75/0.5 A; 75/0.5 R
[58] Field of Search .......................... 75/0.5 A, 0.5 R

[56] References Cited

U.S. PATENT DOCUMENTS

| | | | |
|---|---|---|---|
| 2,585,185 | 2/1952 | Supiro | 75/0.5 A |
| 3,353,950 | 11/1967 | Junghanss | 75/0.5 A |
| 3,971,652 | 7/1976 | Bryson | 75/0.5 A |
| 4,323,390 | 4/1982 | Kruesi | 75/0.5 A |

*Primary Examiner*—Peter D. Rosenberg
*Attorney, Agent, or Firm*—Robert F. Delbridge; Arne I. Fors

[57] ABSTRACT

A process for the production of fine copper powder with particles having a size less than about 5 micrometers, comprises providing an ammoniacal cuprous salt solution, and neutralizing ammonia in said solution with acid in a substantially oxygen-free environment to produce substantially oxygen-free fine spherical copper powder.

20 Claims, 1 Drawing Figure

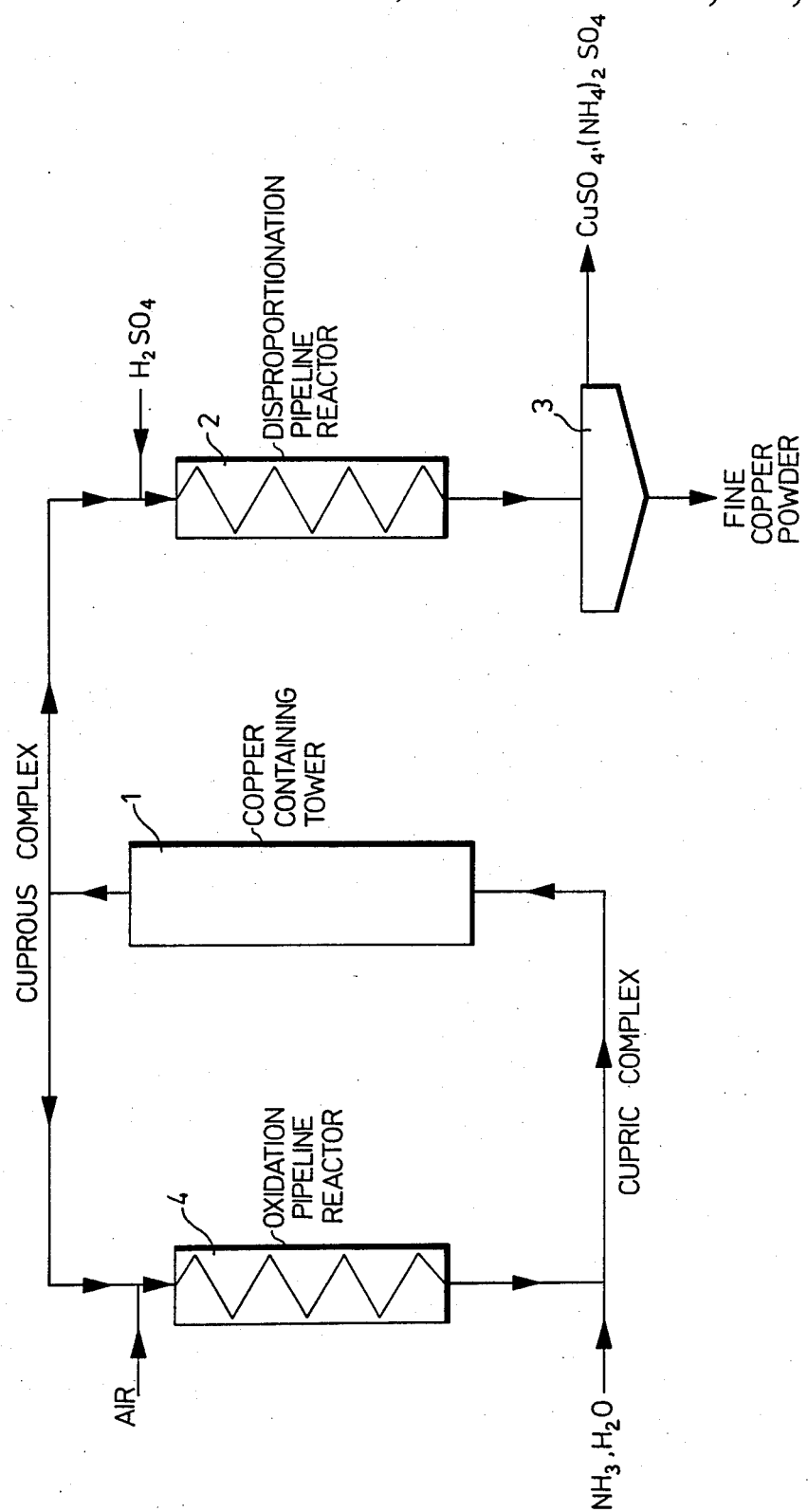

PRODUCTION OF FINE SPHERICAL COPPER POWDER

This is a continuation-in-part of application Ser. No. 651,566 filed Sept. 18, 1984 and now abandoned.

This invention relates to the production of fine copper powder, that is to say comprising particles with a size less than about 5 micrometers and with an average size of about 1 to about 3 micrometers.

There is a commercial requirement for fine copper powder which is relatively oxygen less than about 1% oxygen by weight, and which comprises substantially spherical and separate particles to provide a relatively high bulk density. It is difficult to obtain fine copper powder confirming to these requirements by use of known processes.

Fine copper powder with acceptable physical properties can be produced by hydrogen reduction of an ammoniacal copper sulphate slurry in an autoclave. However, fine copper powder produced by such a process is usually found to contain an undesirably high amount of oxygen which is difficult to remove while at the same time preserving the desirable properties of the copper powder.

It is also known to produce fine copper powder by causing the disproportionation of cuprous ions in accordance with the following reaction:

$$2Cu^+ \rightarrow Cu^\circ + Cu^{2+}$$

A process of this kind is described in "Copper(1) Disproportionation Equilibrium in a Sulphuric Acid Medium at 100°–200° C." by Klyain et al, published in Izv. Vyssh. Ucheb. Zaved., Tsvet. Met. 1974, 17 (3), 27–32. It utilizes the known temperature dependence of the disproportionation equilibrium with the equilibrium being shifted with decreasing temperature towards the formation of copper powder.

A further process of this kind is described in British Pat. No. 1,381,666 published in January, 1975 and utilizes the fact that the disproportionation equilibrium is shifted towards cuprous ion formation by the presence of an organic nitrile, with subsequent production of copper powder by removal of the nitrile.

A Paper entitled "A New Chemical Process for the Production of High Purity Copper Powder from Copper Sulphate or Copper Nitrate Soluiton" by Chupungo et al, published in Powder Metallurgy International Vol. 14, No. 4, 1982, describes a process comprising treating a cupric ammonium sulphate or nitrate complex with sulphur dioxide to precipitate a crystalline solid, which is then treated with sulphuric acid to produce metallic copper.

However, for various reasons, none of these prior processes is particularly suitable for commercial production of fine copper powder with the properties referred to above.

The present invention is based on the discovery that, when the disproportionation equilibrium is shifted towards cuprous ion formation by the presence of ammonia, the equilibrium can be shifted towards the formation of copper powder by the neutralization of ammonia with acid in a substantially oxygen free environment to produce fine copper powder with previously described desirable properties.

It has been found that the starting cuprous ion complex should preferably have an ammonia to cuprous ion concentration of at least 2:1 and more preferably 4:1 in order to stabilize the cuprous ions by formation of the diammine cuprous ion $[Cu(NH_3)_2]^+$ and to provide excess ammonia to provide a chemical driving force. The cuprous ion complex may be produced for example by dissolving metallic copper in an ammoniacal cupric salt solution in a substantially oxygen free atmosphere, with an initial ammonia to copper molar ratio in the solution of at least 4:1 and preferably 8:1 to maximize the formation of cuprous copper. An advantage of this feature is that the properties of the fine copper produced in accordance with the invention are independent of those of the metallic copper starting material. Alternatively, the starting cuprous ion complex may be produced by reduction of ammoniacal cupric salt solution with a reductant, for example hydrazine. The solution may conveniently be a sulphate solution.

The treatment of ammoniacal cuprous salt solution with acid such as sulphuric acid may be carried out in an agitated container under an oxygen free atmosphere or by passing the ammoniacal cuprous salt solution through a pipeline reactor under turbulent conditions. The pH should be lowered to less than about 3, preferably to about 1.5 to 2.5.

An embodiment of the invention will now be described by way of example, with reference to the accompanying drawing which shows a flow diagram of a process for producing fine copper powder.

Referring to the drawing, metallic copper material such as copper shot is contained in a tower 1 through which ammoniacal cupric sulphate solution is passed, the ammonia content of the solution being such that the ammonia to copper molar ratio is about 8:1, with the solution being cupric tetrammine sulphate solution. The tower 1 is maintained at a temperature of at least 60° C., preferably about 75° to 80°, to promote dissolution of the copper to form a cuprous diammine sulphate solution containing about 90 g/L $Cu^+$ and about 100 g/L $NH_3$ at a pH of over 9 in accordance with the following equation:

$$Cu(NH_3)_4SO_4 + Cu^\circ + 4NH_3 = [Cu(NH_3)_2]_2SO_4 + 4NH_3$$

Approximately one half of the cuprous diammine sulphate solution from the top of the tower 1 is mixed with sulphuric acid solution and passed through a water cooled pipeline reactor 2 through which the mixed solutions flow in turbulent manner to lower the pH to 1.5 to 2.5 with resultant disproportionation of the cuprous ions to produce copper powder in accordance with the following equation:

$$[Cu(NH_3)_2]_2SO_4 + 4H_2SO_4 + 4NH_3 = Cu^\circ + CuSO_4 + 4(NH_4)_2SO_4.$$

The resultant slurry is then passed to a thickener 3, the underflow being fine copper powder which is then filtered, washed and dried in an oxygen-free atmosphere.

The overflow solution from the thickener 3 contains copper sulphate and ammonium sulphate. This solution may for example be treated with hydrogen sulphide to precipitate copper sulphide and recover ammonium sulphate solution, or treated with lime to precipitate gypsum and produce more cupric tetrammine sulphate solution.

The other half of the cuprous ion complex solution from the top of the tower 1 is mixed with air and passed through an oxidation reactor in the form of a pipeline reactor 4 to oxidize the cuprous ion complex to a cupric ion complex which; with the addition of ammonia and water, is returned to the bottom of the tower 1.

By means of such a process in accordance with the present invention, it is possible to produce copper powder with a bulk density of up to 4.0 g/cm$^3$, with an average particle size of two or three micrometers, and an oxygen content of less than 1% by weight. It is also possible to produce fine copper powder with such properties and containing less than 0.02% sulphur. Further, when the starting copper material is contaminated with other elements such as nickel, cobalt, arsenic or antimony, it has been found that the fine copper powder produced contains only minimal amounts of such elements.

Another anion, such as for example $Cl^-$, could be used instead of $SO_4^{2-}$ in the described process if desired.

Other examples and embodiments of the invention will be readily apparent to a person skilled in the art from the foregoing description.

What we claim as new and desire to protect by Letters Patent of the United States is:

1. A process for the production of fine copper powder with particles having a size less than about 5 micrometers, the process comprising providing an ammoniacal cuprous salt solution, and neutralizing ammonia in said solution with acid in a substantially oxygen-free environment to produce substantially oxygen-free fine spherical copper powder.

2. A process according to claim 1 comprising providing an ammoniacal cuprous salt solution with an ammonia to cuprous ion concentration of at least about 2 to 1.

3. A process according to claim 2 comprising providing an ammoniacal cuprous salt solution with an ammonia to cuprous ion concentration of at least about 4 to 1.

4. A process according to claim 2 comprising providing the ammoniacal cuprous salt solution by dissolving metallic copper in an ammoniacal cupric sale solution in a substantially oxygen-free atmosphere.

5. A process according to claim 4 comprising dissolving metallic copper in ammoniacal cupric salt solution with an initial ammonia to copper molar ratio in the solution of at least about 4 to 1.

6. A process according to claim 5 comprising dissolving metallic copper in an ammoniacal cupric salt solution with an initial ammonia to copper molar ratio in the solution of at least about 8 to 1.

7. A process according to claim 1 comprising neutralizing ammonia in said solution with acid to lower the pH to less than about 3.

8. A process according to claim 7 comprising neutralizing ammonia in said solution with acid to lower the pH to a value in the range of from about 1.5 to about 2.5.

9. A process according to claim 1 comprising providing an ammoniacal cuprous sulphate solution, and neutralizing ammonia in said solution with sulphuric acid.

10. A process according to claim 1 comprising passing ammoniacal cupric salt solution through a first reactor containing metallic copper to produce the ammoniacal cuprous salt solution by dissolution of metallic copper, and passing at least a portion of the ammoniacal cuprous salt solution from the first reactor through a second reactor with acid to neutralize ammonia in said solution and produce substantially oxygen-free fine spherical copper powder.

11. A process according to claim 10 comprising passing a portion of the ammoniacal cuprous salt solution from the first reactor through a third reactor with an oxidant to oxidize the solution to ammoniacal cupric salt solution, and passing the ammoniacal cupric salt solution with added ammonia to the first reactor.

12. A process according to claim 10 comprising passing ammoniacal cupric salt solution through the first reactor containing metallic copper to produce an ammoniacal cuprous salt solution with an ammonia to cuprous ion concentration of at least about 2 to 1.

13. A process according to claim 12 comprising passing ammoniacal cupric salt solution through the first reactor containing metallic copper to produce an ammoniacal cuprous salt solution with an ammonia to cuprous ion concentration of at least about 4 to 1.

14. A process according to claim 12 comprising passing ammoniacal cupric salt solution with an initial ammonia to copper molar ratio in the solution of at least about 4 to 1 into the first reactor.

15. A process according to claim 13 comprising passing ammoniacal cupric salt solution/with an initial ammonia to copper molar ration in the solution of at least about 8 to 1 into the first reactor.

16. A process according to claim 10 comprising passing at least a portion of the ammoniacal cuprous salt solution from the first reactor through a pipeline reactor with acid to neutralize ammonia in said solution.

17. A process according to claim 16 comprising passing at least a portion of the ammoniacal cuprous salt solution from the first reactor through the pipeline reactor with acid to neutralize ammonia in said solution by lowering the pH to less than about 3.

18. A process according to claim 17 comprising passing at least a portion of the ammoniacal cuprous salt solution from the first reactor through the pipeline reactor with acid to neutralize ammonia in said solution by lowering the pH to a value in the range of from about 1.5 to about 2.5.

19. A process according to claim 10 comprising passing ammoniacal cupric sulphate solution through a first reactor containing metallic copper to produce ammoniacal cuprous sulphate solution by dissolution of metallic copper, and passing at least a portion of the ammoniacal cuprous sulphate solution from the first reactor through a pipeline reactor with sulphuric acid to neutralize ammonia in said solution.

20. A process according to claim 19 comprising passing a portion of the ammoniacal cuprous sulphate solution from the first reactor through a third reactor with an oxidant to oxidize the solution to ammoniacal cupric sulphate soluiton, and passing the ammoniacal cupric sulphate solution with added ammonia to the first reactor.

* * * * *